United States Patent [19]

Montoya

[11] 4,033,635
[45] July 5, 1977

[54] ELECTRONIC CONTROL DEVICES APPLICABLE TO ANTI-SKID EQUIPMENT IN AUTOMOBILE VEHICLES

[75] Inventor: Jose Maria Tarrafeta Montoya, Madrid, Spain

[73] Assignee: Fabrica Espanola Magnetos, S.A., Madrid, Spain

[22] Filed: Apr. 1, 1976

[21] Appl. No.: 672,774

Related U.S. Application Data

[63] Continuation of Ser. No. 515,496, Oct. 17, 1974, abandoned.

[30] Foreign Application Priority Data

Mar. 13, 1974 Spain .................................. 424230

[52] U.S. Cl. ........................... 303/109; 188/181 C; 303/20
[51] Int. Cl.² ......................................... B60T 8/10
[58] Field of Search ................. 73/503, 510, 517 R; 188/181 C; 303/20, 106, 109, 111; 307/10 R; 317/5; 324/161; 340/53, 62, 263

[56] References Cited

UNITED STATES PATENTS

| 3,498,682 | 3/1970 | Mueller et al. ..................... 303/109 |
| 3,712,109 | 1/1973 | Haken ............................. 73/517 R |
| 3,768,873 | 10/1973 | Hirzel ............................... 303/109 |
| 3,807,811 | 4/1974 | Makamura et al. ................. 303/109 |
| 3,847,448 | 11/1974 | Okamoto et al. .................. 303/111 |

*Primary Examiner*—Stephen G. Kunin
*Attorney, Agent, or Firm*—Friedman, Goodman & Teitelbaum

[57] ABSTRACT

The present invention refers to an electronic control device applicable to anti-skid equipment in automobile vehicles which compares the speed of the wheel with a voltage corresponding to the level of optimum vehicle-wheel slip. On the basis of the result of this comparison, the device operates an actuating system that increases or decreases the pressure on the brakes with the aim of maintaining the slip of the wheel around the skid for which maximum adherence is presented.

1 Claim, 3 Drawing Figures

ELECTRONIC CONTROL DEVICES APPLICABLE TO ANTI-SKID EQUIPMENT IN AUTOMOBILE VEHICLES

This is a continuation of application Ser. No. 515,496, filed Oct. 17, 1974, now abandoned.

The present invention refers to an electronic control device applicable to anti-skid equipment in automobile vehicles, capable of activating at least one electro-valve that governs a hydraulic circuit, which increases or decreases the pressure of the brakes on the wheel or axle concerned.

This device succeeds in maintaining the speed of the wheel to which it is applied around the slip valve corresponding to the maximum adherence between the wheel and the road surface, in order to achieve a minimum braking distance, conserving maneuverability of the vehicle at all times.

In the circuit constituting the subject of the present invention an electric signal is obtained indicative of the slipping of each wheel involved from a sensor of the deceleration of the vehicle, common to all the circuits that are incorporated in the vehicle, and a special sensor to determine the speed of the wheels in question. This signal is compared with another electric voltage representative of the optimum wheel slip, that is to say, that corresponding to the maximum adherence. This slip is obtained cycle by cycle in the form that will be described hereinafter. The result of the comparison between the two signals that have been mentioned, those of real slip and of optimum slip is that which will be used to take the decision to apply or remove pressure at the brakes.

The slip for which the maximum adherence between wheel and road surface is obtained varies according to the state of the terrain, and within one and the same state of the terrain varies with the velocity of the vehicle; it is for this reason that it should be measured several times during the operation of braking.

This optimum slip can be detected at the points at which the acceleration of the wheel is maximum in the absence of the brake torque, since the only torque that causes the wheel to rotate is precisely that of friction; then the point of maximum acceleration corresponds to that of maximum adherence, and the slip value at that moment is the optimum.

In the attached drawings, included by way of non-limitative example, a preferential implementation of the invention is represented.

Figure 1:
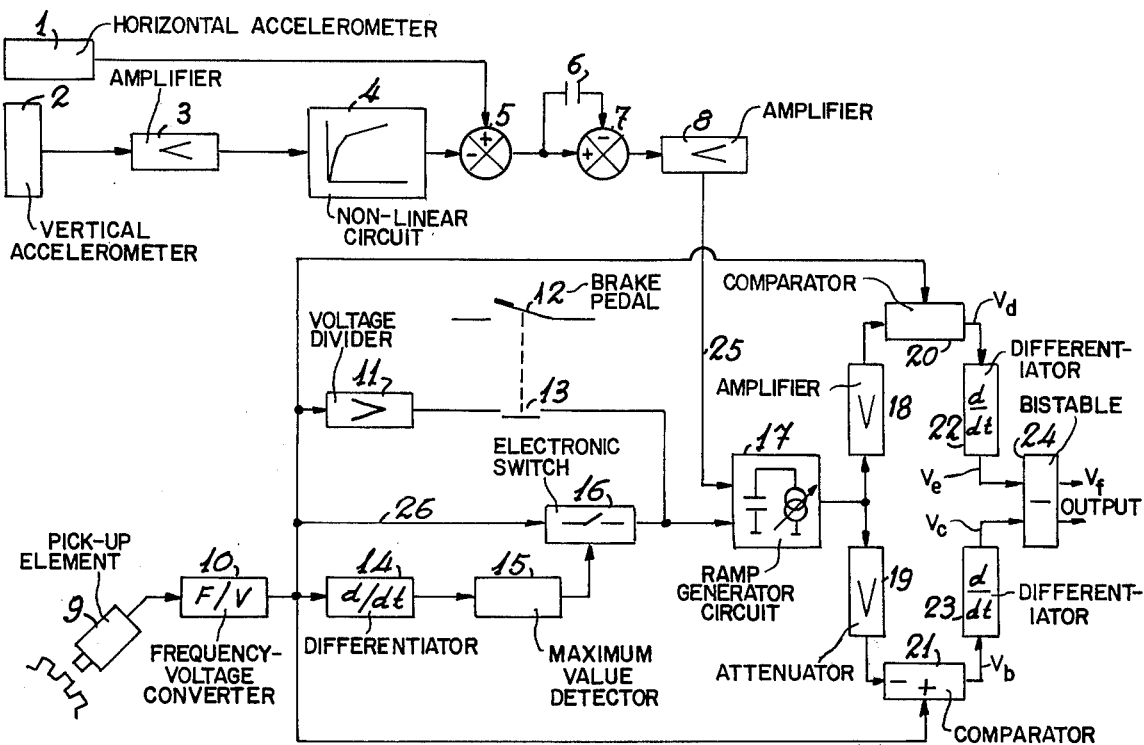
FIG. 1 represents the block diagram of the invention.

With reference to FIG. 1, the form of obtaining the deceleration of the vehicle will be seen. For this purpose, use will be made of at least one accelerometer 1 of the piezo-electric type resistive in the direction of movement of the vehicle. The use of an accelerometer involves certain problems that will be mentioned as follows.

When the vehicle is braked on a road which is not horizontal, the accelerometer gives a signal, being a function of the sine of the angle of the road gradient which will modify the acceleration measurement due to the additional component of force acting to the direction of the sensitivity of the accelerometer caused by gravitational forces reacting on the mass of the accelerometer.

This defect can be diminished and even eliminated by the addition of at least another accelerometer situated in a vertical plane, solidly joined to the previous accelerometer, since the effect of the road gradient also manifests itself in the additional accelerometer. However, on the accelerometer situated in a vertical direction, the component of force due to the road gradient gives a signal being a function of the cosine of the gradient of the road; it therefore will be necessary to incorporate some type of circuit that will transform the cosine function into a sine function. With this objective, the first part of the circuit will be described as follows: The signal obtained in the accelerometer 1 situated in the direction of travel of the vehicle is taken to an input of a subtractor 5, and to whose other input the signal proceeding from the second accelerometer 2 situated in a vertical position is also taken, duly amplified by the circuit 3 and passed through a non-linear circuit 4 that has the function of transferring the form cosine-sine. The circuit 4 can be, for example, of the piecewise linear type, in any of its variants, either on the basis of resistances and transistors or with an operational amplifier, resistance and diodes. At the output of the subtractor 5 a voltage proportional to the deceleration of the vehicle is obtained, irrespective of the road gradient. Another problem that occurs in the use of accelerometers is the combined effect of the inherent noise of the accelerometer and that due to the vibrations in the fixing device. This noise is normally of high frequency in relation to the frequency of the signal, and is easy to eliminate, for example, by taking to a subtractor 7, which can be of the operational amplifier type, with the signal plus the noise, forming an input and the noise only signal forming the other, the result of the subtractor will be that the clean signal will appear at the output. This is achieved by means of the L. F. blocking condensor 6 in conjunction with the subtractor 7. This output signal, amplified in the circuit 8, represents the true deceleration of the vehicle.

The information of the speed of the wheel is obtained by means of a pick-up 9 of an electro-magnetic, optical or similar known type, in the form of a signal whose frequency is directly proportional to the speed of the wheel. This signal is transformed by the circuit 10 which is a frequency-voltage converter, linear and instantaneous with three stages, identical to that described in our U.S. patent application Ser. No. 477,999 dated June 10, 1974, producing an input voltage directly proportional to the input frequency.

The voltage proportional to the speed of the wheel is taken to a differenting circuit 14 at the output of which a signal proportional to the acceleration of the wheel is obtained. This is then fed through a circuit for detecting maximum values 15 which gives a voltage pulse whenever the acceleration passes through a maximum.

Also, the wheel velocity signal is taken to an electronic switching circuit 16 which is normally open and which closes whenever a voltage pulse from the maximum value detector 15 is applied to its control input. This switching circuit 16 can, for example, be formed by two transistors in parallel, one NPN type and the other PNP type, joined terminal to terminal in series with the output line of the frequency/voltage converter wire 26 and whose bases receive the voltage pulse that proceeds from 15, with the result that the condenser incorporated in a ramp generator circuit 17 attains a voltage value equal to that in the converter output 26, whenever a pulse is received from the maximum value detector 15.

The converter output voltage representing the speed of the wheel at the moments when its acceleration passes through a maximum is transferred to the ramp generator circuit 17, which consists, for example, of a condenser which is charged or discharged instantaneously to the value of the converter output voltage proportional to the speed of the wheel, whenever 16 is short-circuited, and afterwards it is discharged in a linear manner through a transistor whose collector current is governed by the voltage proportional to the deceleration of the vehicle forming the output line 25. A further input to the circuit 17 carries a signal representing a predetermined fraction of the speed of the wheel by means of a voltage divider 11 and a circuit-breaker 13, which is normally closed. This causes, prior to braking, when the signal of deceleration of the vehicle is practically zero, the previously mentioned condenser of the circuit 17 to be charged to a voltage, representative of a fraction of the speed of the wheel; thus, at the moment of operating the brake pedal 12 the circuit-breaker 13 is opened, and an initial output signal of the circuit 17 representative of a pre-fixed slip value is obtained creating the initial ramp position.

Figure 2:
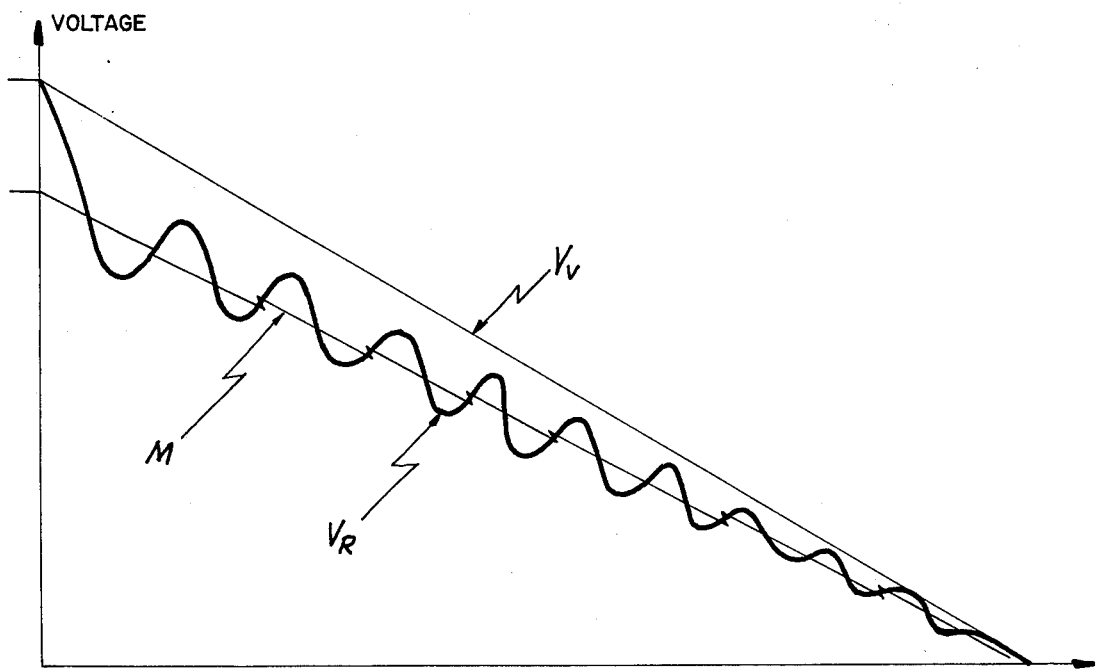
FIG. 2 shows a graph explanatory of the invention's functioning.

In accordance with the foregoing explanation, it can be seen that at the output of the circuit 17 a voltage M shown in FIG. 2 is obtained, which, cycle by cycle, gives a signal representative of the absolute slip at the beginning of each cycle, it being understood by the term absolute slip the difference in speed between the vehicle and the wheel. The steps observed in the reference voltage M are the corrections of the aforesaid reference voltage according to the maximum acceleration detected, at the point of optimum slip.

If this voltage is compared with the speed of the wheel, a criterion is obtained for the application removal of the braking pressure. However, since the electro mechanical hydraulic actuator has a relatively long response time from the moment at which the electrical system commands a change of pressure until the pressure physically varies in the brakes, with a system such as that described, the wheel will be moving around the maximum of the adherence-slip curve coefficient within a range given by the lag of the actuator on each side of the maximum shown in FIG. 2 by the difference between the wheel velocity $V_r$ and reference velocity M. This deviation indicates a failure to make full use of the maximum adherence available during braking, and can be mitigated by reducing this excursion around the reference velocity signal, by situating two levels of actuation, one to apply and one to remove vehicle brakes; that of brake removal with a slip value less than the optimum, and that of application with a slip value greater than the optimum. This will be better understood by referring to FIG. 3.

In order to obtain these two levels of slip, an amplifier circuit 18 and an attenuator circuit 19 can be situated, for example, at the output of the ramp generator 17, the outputs of the amplifier and attenuator which are fed to two comparator circuits 20 and 21 each having another input fed by the voltage representative of the speed of the wheel. These comparators give an output signal which can be, for example, positive when the voltage injected into the positive input is greater than that injected at the negative input, and zero in the opposite case. This is shown in FIGS. 1 and 3.

The square waves obtained in the comparators 20 and 21 are taken across the differentiators 22 and 23 whose output command a bistable 24 which acts on at least one electro-valve which in turn governs the brake pressure hydraulic circuit.

FIG. 2 represents the voltages proportional to the speed of the vehicle $V_v$, the speed of the wheel $V_r$ and the output voltage M of the ramp generator 17 respectively; in this Figure it can be seen that the voltage M has steps that coincide with the points of inflexion of the curve representative of the velocity of the wheel $V_r$ which occur during every cycle when the slope is positive (wheel velocity approaching vehicle velocity) and; as has been previously said, represents the points of maximum adherence. Moreover, it may be observed that the slope of the voltage M is at all times equal to that of the speed of the vehicle $V_v$, since both are governed by the deceleration of the vehicle.

Figure 3:
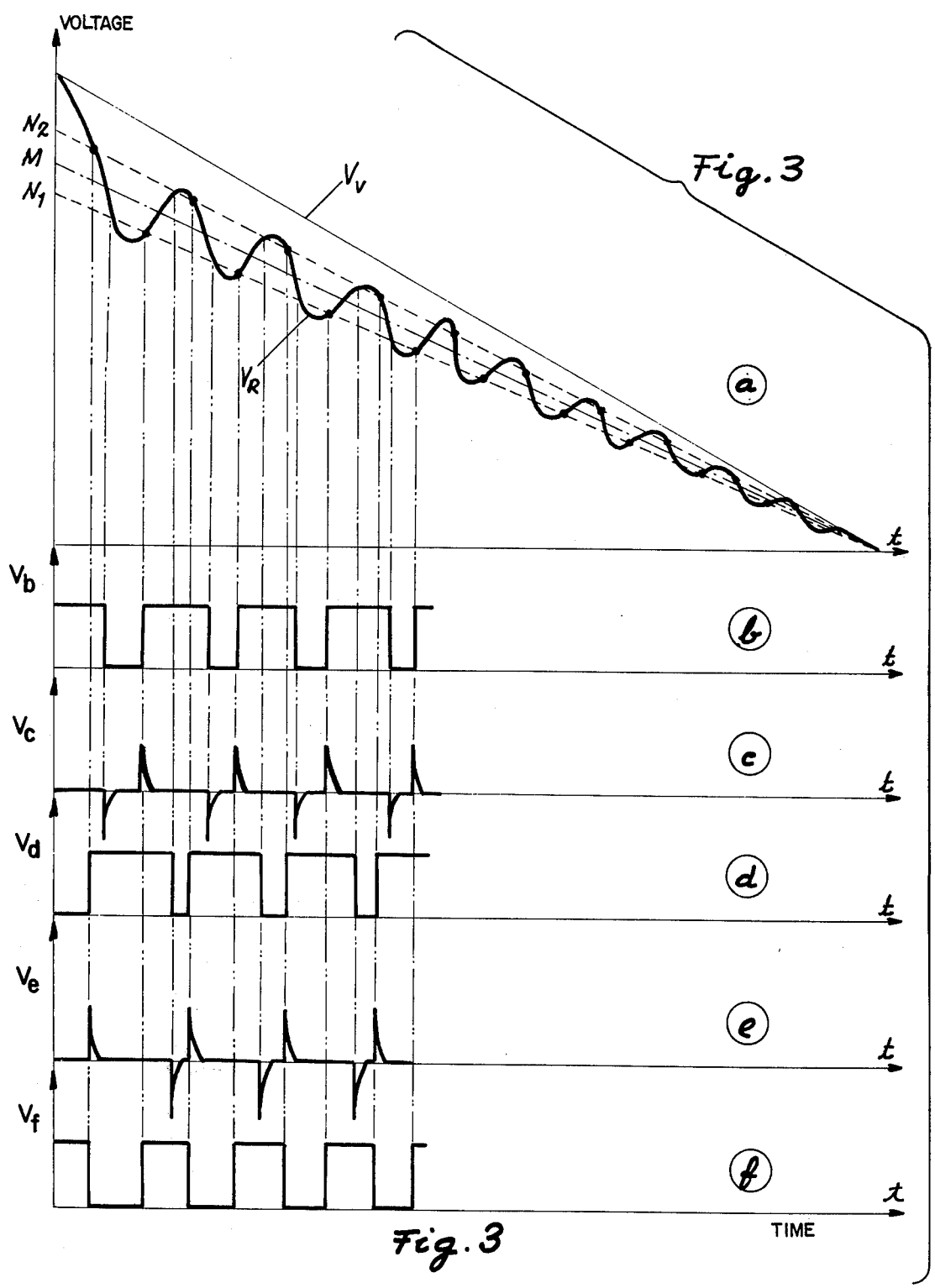
FIG. 3 shows a chronogram of signals throughout the circuit.

In FIG. 3 graph (a), the velocity of the vehicle $V_v$, the velocity of the wheel $V_r$ and the two levels of slip $N_1$ and $N_2$ obtained by amplification and attenuation of the output voltage of the ramp generator M are represented. The points marked on the curve $V_r$ coincident with $N_1$ and $N_2$ represent the points of application and removal of the brake pressure. In this Figure it has been assumed that the references relative slip $(V_v - M/V_v)$ is maintained constant, for the sake of simplicity and clarity in the representation. In this Figure it may also be observed that the choice of levels of comparison $N_1$ and $N_2$ are dependent on the lag of the actuator system, as is hereinafter described.

The level $N_2$ serves as a reference to effect the brake pressure reduction. From the instant at which the order is given until the wheel commences to re-accelerate, a time passes due to the lag of the actuator system; consequently, by anticipating the point of de-actuation on the level of optimum skid, results in a reduced excursion of the wheel velocity from the optimum, giving better performance than if the order had been given utilizing the optimum slip as the level of comparison. A similar phenomenon occurs when re-applying the brakes marked on the level $N_1$. It has been verified experimentally that for an actuator system with a lag of 80 ms., the slip in the most unfavourable case will vary during this lag time by 12 per cent, which is that which will mark the separation of levels for the actuator in question. The choice of levels should be carefully made, since in the event of their being too widely separated, a permanent locking of the wheel can be produced or a de-activation of the brake pressure during an indefinite period can occur.

In FIG. 3 graph (b), the output voltage $V_b$ of the comparator 21 is shown, and, as may be seen, it is positive when the speed of the wheel is greater than the level $N_1$ of output of the attenuator 19.

In FIG. 3 graph (c), the output voltage $V_c$ of the differentiator 23 is represented.

In FIGS. 3 graph (d) and 3 (e), there are likewise represented the output voltages $V_d$ and $V_e$ of the comparator 20 and of the differentiator 22, the output of the comparator being positive when the speed of the wheel is inferior to the output level $N_2$ of the amplifier 18.

Finally, in FIG. 3 graph (f), there is a representation of the signals $V_f$ corresponding to the output of the bistable 24. The bistable 24 is designed in such a manner that when the circuit is initially connected, the circuit activates the bistable output corresponding to pressure on the brake.

The vehicle has a speed sensor and an associated circuit system independent for each axle or wheel the blocks numbered from 1 to 8, inclusive, being common for all the wheels or axles.

The nature of the invention having been sufficiently described, together with its practical embodiment, it only remains to add that in the whole and parts described it is possible to introduce changes, provided that such changes do not produce a substantial variation in the essence of the invention.

What is claimed is:

1. An electronic control device applicable to anti-skid equipment in automobile vehicles, said device comprising;
   elements for maintaining each wheel of a vehicle at an optimum value of slip for which road surface to wheel adherence is at a maximum level, a velocity corresponding to said slip value being obtained from a first unit generating a signal corresponding to an acceleration of the vehicle and a second unit generating a signal corresponding to the velocity of the wheel at an instant in which the acceleration of the wheel is at a maximum value with its brake released;
   means for generating a signal corresponding to a deceleration of the vehicle comprising a longitudinal accelerometer and a corrector circuit for eliminating any errors due to road slope;
   means for generating a signal corresponding to the velocity of the wheel;
   means for generating a comparison signal representative of the velocity corresponding to the optimum value of slip from the deceleration of the vehicle, said comparison signal being corrected to a value of the optimum slip level in each reacceleration of the wheel by means of a differentiator and a detector of maximums;
   means for comparing the velocity of each wheel with a comparison signal, and according to a result thereof, applying and releasing the brake pressure of said wheel as required; and
   means for changing the comparison signal depending upon the response of the brake actuator of the vehicle.

* * * * *